US012768702B2

(12) United States Patent
Pan

(10) Patent No.: US 12,768,702 B2
(45) Date of Patent: Oct. 20, 2026

(54) FAST AND ACCURATE MASS FLOW CONTROLLER

(71) Applicant: Yang Pan, Singapore (SG)

(72) Inventor: Yang Pan, Singapore (SG)

(73) Assignee: Inspiring Atoms Pte Ltd, Singapore (SG)

( * ) Notice: Subject to any disclaimer, the term of this patent is extended or adjusted under 35 U.S.C. 154(b) by 275 days.

(21) Appl. No.: 18/675,043

(22) Filed: May 27, 2024

(65) Prior Publication Data

US 2025/0362169 A1 Nov. 27, 2025

(51) Int. Cl.

*G01F 25/17* (2022.01)
*G01F 1/684* (2006.01)
*G01F 1/86* (2006.01)
*G01F 25/10* (2022.01)
*G05D 7/06* (2006.01)

(52) U.S. Cl.

CPC ................ *G01F 25/17* (2022.01); *G01F 1/86* (2013.01); *G05D 7/0617* (2013.01)

(58) Field of Classification Search

CPC ... G01F 25/00; G01F 1/76; G01F 1/34; G01F 1/6965; G01F 25/13; G01F 25/15; G01F 1/6847; G01F 1/68; G01F 1/36; G01F 25/0007; G01F 25/10; G01F 25/0092; G01F 15/024; G01F 1/37; G01F 5/00; G01F 1/50; G01F 1/363; G01F 1/74; G01F 1/684; G01F 1/696; G01F 1/42; G05D 7/0647; G05D 7/00; G05D 7/0623; G05D 7/0635; G05D 7/06; G05D 7/0629; G05D 16/2053; G05D 7/0658; F16K 31/0655; F16K 49/00; F16K 31/402; F16K 31/02; F16K 37/005; F16K 7/14; F16K 31/0693; B01F 23/19; H01J 37/32449; C23C 14/35; C23C 16/45561; C23C 16/45557; C23C 16/45512; G05B 13/042; G05B 13/021; H10P 72/0402; H01L 21/67017; F17D 1/16; F17D 1/00; A61M 16/10; A61M 16/205

USPC .......................................................... 73/1.31

See application file for complete search history.

(56) References Cited

U.S. PATENT DOCUMENTS

| | | | |
|---|---|---|---|
| 3,335,748 | A | 8/1967 | Klemm et al. |
| 3,910,113 | A | 10/1975 | Brown |
| 4,718,443 | A | 1/1988 | Adney et al. |
| 5,003,810 | A | 4/1991 | Jepson et al. |
| 5,190,068 | A | 3/1993 | Philbin |
| 5,624,409 | A | 4/1997 | Seale |
| 5,988,211 | A | 11/1999 | Cornell |
| 6,178,995 | B1 | 1/2001 | Ohmi et al. |
| 6,314,991 | B1 | 11/2001 | Gill |
| 6,631,334 | B2 | 10/2003 | Grosshart |

(Continued)

FOREIGN PATENT DOCUMENTS

TW 201417990 A 4/2014

*Primary Examiner* — Brandi N Hopkins

(57) ABSTRACT

The invention relates to a mass flow controller designed for precise and rapid fluid flow management without using a proportional valve and a proportional-integral-derivative (PID) control loop. It features a solenoid control valve and a controller that uses a calibration database, potentially including a lookup table or neural network, to determine the appropriate solenoid coil current for various fluids, ensuring high-speed and accurate flow control.

20 Claims, 4 Drawing Sheets

(56) References Cited

U.S. PATENT DOCUMENTS

| | | | | |
|---|---|---|---|---|
| 6,868,862 | B2 | 3/2005 | Shajii et al. | |
| 7,073,392 | B2 | 7/2006 | Lull et al. | |
| 7,376,520 | B2 | 5/2008 | Wong et al. | |
| 7,431,045 | B2 | 10/2008 | Mudd et al. | |
| 7,706,925 | B2 | 4/2010 | Ding et al. | |
| 7,757,554 | B2 | 7/2010 | Ding et al. | |
| 7,822,570 | B2 | 10/2010 | Shareef et al. | |
| 7,905,139 | B2 | 3/2011 | Lull | |
| 8,646,307 | B2 | 2/2014 | Yasuda et al. | |
| 9,027,585 | B2 | 5/2015 | Smirnov | |
| 9,188,989 | B1 | 11/2015 | Mudd et al. | |
| 9,234,775 | B2 | 1/2016 | Larson et al. | |
| 9,304,030 | B2 | 4/2016 | Tanaka et al. | |
| 9,557,744 | B2 | 1/2017 | Ding | |
| 9,766,635 | B2 | 9/2017 | Smirnov et al. | |
| 9,797,765 | B2 | 10/2017 | Nagai | |
| 9,952,078 | B2 | 4/2018 | Ding et al. | |
| 9,983,595 | B2 | 5/2018 | Monkowski et al. | |
| 10,054,959 | B2 | 8/2018 | Somani | |
| 10,386,861 | B2 | 8/2019 | Hirata et al. | |
| 10,591,934 | B2 | 3/2020 | Gopalakrishnan et al. | |
| 10,606,285 | B2 | 3/2020 | Ding | |
| 10,782,165 | B2 | 9/2020 | Mudd et al. | |
| 10,801,867 | B2 | 10/2020 | Ding | |
| 11,041,749 | B1 * | 6/2021 | Smirnov | G01F 25/10 |
| 11,662,237 | B2 | 5/2023 | Shareef et al. | |
| 2011/0247390 | A1 * | 10/2011 | Smirnov | G05D 7/0635<br>73/1.16 |
| 2012/0180876 | A1 | 7/2012 | Hayashi et al. | |
| 2014/0069527 | A1 | 3/2014 | Mudd et al. | |
| 2015/0027558 | A1 | 1/2015 | Kehoe et al. | |
| 2017/0168509 | A1 * | 6/2017 | Ito | G05D 7/0635 |

* cited by examiner

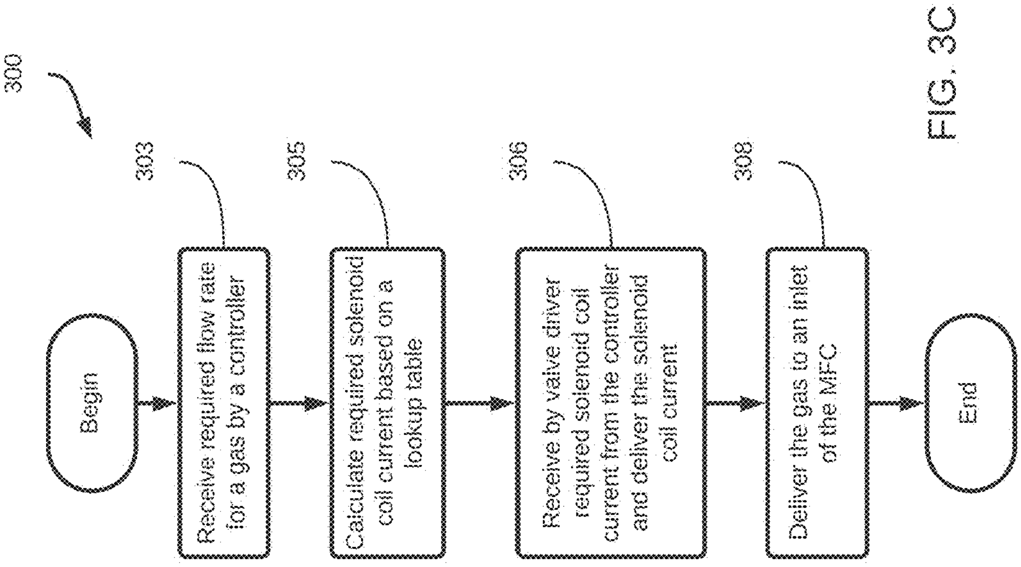
FIG. 3C
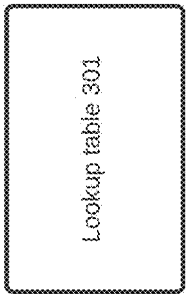
FIG. 3B
302
| Gas | Temperature | Coil current | Flow rate |
|---|---|---|---|
| A | T1 | I1 | F1 |
| A | T1 | I2 | F2 |
| A | T1 | I3 | F3 |
| A | | | |
| A | T1 | IN | FN |
304
| Gas | Temperature | Coil current | Flow rate |
|---|---|---|---|
| B | T2 | I1 | F1 |
| B | T2 | I2 | F2 |
| B | T2 | I3 | F3 |
| B | | | |
| B | T2 | IN | FN |
FIG. 3A

FAST AND ACCURATE MASS FLOW CONTROLLER

FIELD OF THE INVENTION

The invention pertains to systems and methods of flow control. Specifically, it deals with the precise control of mass flow, especially for processes demanding high-speed and accurate flow management.

BACKGROUND OF THE INVENTION

Mass flow controllers (MFCs) are instrumental in measuring and regulating the flow of fluids, such as gases or liquids. Predominantly employed to modulate the flow into semiconductor process chambers, it is imperative for MFCs to ensure utmost precision to guarantee optimal yields for wafers undergoing various processing stages.

Recent advancements in atomic layer processing technologies, including but not limited to atomic layer deposition (ALD) and atomic layer etching (ALE), underscore the need for swiftly switching the flow of gases or liquids into processing chambers. This rapid transition is crucial to enhancing the throughput of such chambers. However, present-day MFCs pose challenges in high-speed flow management. Thus, there is an evident demand for an MFC capable of high-speed and accurate flow rate control.

SUMMARY

While the summary elucidates a range of concepts concisely, it is paramount to consult the Detailed Description for a comprehensive understanding. This summary neither defines the pivotal nor the fundamental features of the claimed matter and should not constrict its scope.

Gases are used as examples to elaborate on the present inventive concepts, although the concepts can be easily extended to other fluids like vapors, liquids, and mixed gases and vapors. In certain embodiments, the MFC comprises a gas-conducting channel fitted with an inlet and an outlet. Depending on the setup, an external calibration apparatus might be directly attached to the MFC's outlet or indirectly connected via a gas delivery mechanism. It is worth noting that calibration can be performed either directly on the MFC or after its integration into a processing system.

Some embodiments of the MFC feature a solenoid control valve to adjust the gas flow rate. This valve includes a spring, a solenoid coil, and a plunger positioned above an orifice in the gas channel. The plunger's proximity to the orifice regulates the flow rate, influenced by both a spring and the magnetic force derived from a current coursing through the coil, with the current modulated by the MFC's controller.

Conventional MFCs employ a proportional valve to redirect a minor gas fraction to an auxiliary path for measurement by flow sensors like thermal flow sensors. The acquired measurements guide the controller in adjusting the plunger's position to achieve the desired flow rate. The controller contrasts the flow sensor's data with preset values to ascertain if alterations in the solenoid control valve's coil current are necessary. Typically, a proportional-integral-derivative (PID) loop stabilizes the flow rate, although the stabilization period can extend to several hundred milliseconds—a duration incompatible with ALD and ALE semiconductor manufacturing techniques.

In some embodiments, the design bypasses the use of a proportional valve, opting instead to calibrate the solenoid coil currents for diverse gases and flow rates with an external calibration device. This calibration data is archived in a controller database.

Further designs incorporate a lookup table in the calibration database. The required current for specific gas types and flow rates can be deduced from this table. Some designs employ linear extrapolation for current determination, while others utilize known mathematical models.

Moreover, certain embodiments integrate a neural network into the calibration database. The solenoid coil's current, tailored for a particular gas and flow rate, is gleaned from a neural network's inference operation, which is trained using calibration data.

In other variations, a flow sensor is situated post the solenoid control valve, serving as both a verification tool for the MFC and a malfunction detector.

The embodiments discussed herein abolish the need for upstream flow sensors and proportional valves, along with the PID control loop, considerably simplifying the MFC design. The enhanced design not only accelerates measurements by sidestepping the PID control loop but also ensures uniform process control across varied chambers and systems, since multiple MFCs can be calibrated using a singular external apparatus.

BRIEF DESCRIPTION OF THE DRAWINGS

The described embodiments are best comprehended by referring to the ensuing description in tandem with the accompanying drawings:

FIG. 3A: A diagram, illustrating an exemplary segment of a database.

FIG. 3B: A diagram, showing data represented by a lookup table.

FIG. 3C: A flowchart, outlining the utilization of the lookup table to ascertain the requisite solenoid coil current for a specific flow rate.

DETAILED DESCRIPTION

In the subsequent detailed elucidation of the current invention, certain specific embodiments are delineated to ensure a comprehensive understanding of the invention. Nonetheless, it will be evident to those proficient in the field that the invention can be executed without these particulars, or by employing alternative elements or methodologies. In some cases, well-acknowledged processes, procedures, and components have been intentionally left undetailed to avoid obscuring facets of the invention unnecessarily.

Figure 1:
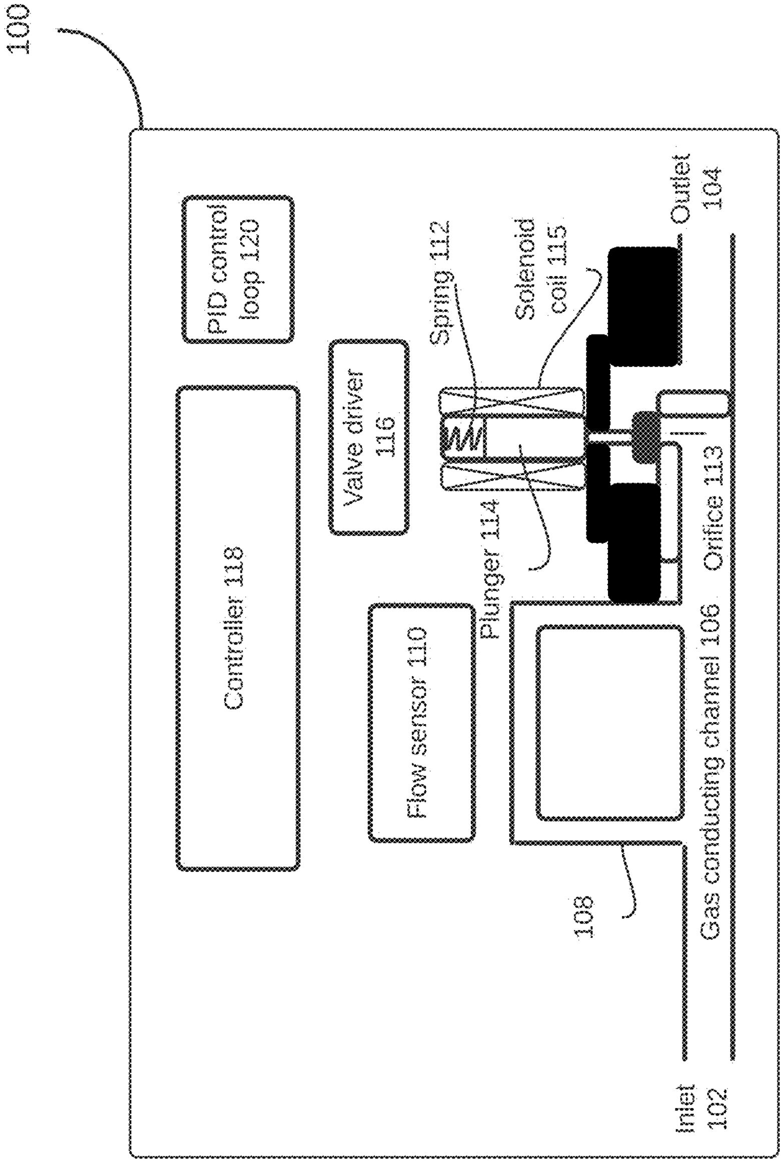
FIG. 1: A schematic representation of a conventional mass flow controller, incorporating a proportional valve, an upstream flow sensor, and a PID control loop.

Referring to FIG. 1, a schematic representation of a conventional MFC 100 is presented. The system 100 comprises an inlet 102 and an outlet 104, both associated with a gas-conducting channel 106. Within the setup, a proportional valve (not depicted in the figure) functions to divert a fraction of the gas towards channel 108. The diverted gas's flow rate is ascertained by the flow sensor 110. Typically, a thermal flow sensor is employed to discern the temperature differential at two designated positions along a flow trajectory. Consequently, the flow rate of the diverted gas serves as a proxy for the flow rate within the gas-conducting channel 106.

Further to the structure of MFC 100, it incorporates a solenoid valve. This valve encompasses a spring 112, which retains the plunger 114. The position of plunger 114 dictates the gas conductance across orifices 113. When the plunger 114 interfaces with orifice 113, gas conduction ceases. Moreover, the solenoid valve associated with plunger 114 is supplemented with a solenoid coil 115. When current courses through coil 115, it induces a magnetic pull. Given that the plunger 114 is traditionally crafted from ferromagnetic materials, the combined mechanical pressure exerted by spring 112 and the magnetic attraction produced by coil 115 act upon the plunger 114. The equilibrium between these forces ultimately prescribes the position of plunger 114.

Flow sensor 110 conveys its readings to the controller 118. This controller juxtaposes the received data against a pre-established value residing within its memory. This predefined value is derived from the desired gas flow rate as stipulated in a process recipe. Should a discrepancy arise between the sensor's reading and the benchmarked value, the controller 118 dispatches a directive to valve driver 116. In turn, the valve driver 116 formulates a revised current for coil 115, prompting a positional shift in plunger 114. Post this repositioning, flow sensor 110 re-evaluates the flow rate of the redirected gas. This calibration loop continues until the observed flow rate aligns with the benchmarked rate. To expedite this process, controller 118 employs a PID control loop. Typically, this calibration phase spans several hundred milliseconds, a duration that is suboptimal for ALD and ALE.

Figure 2B:
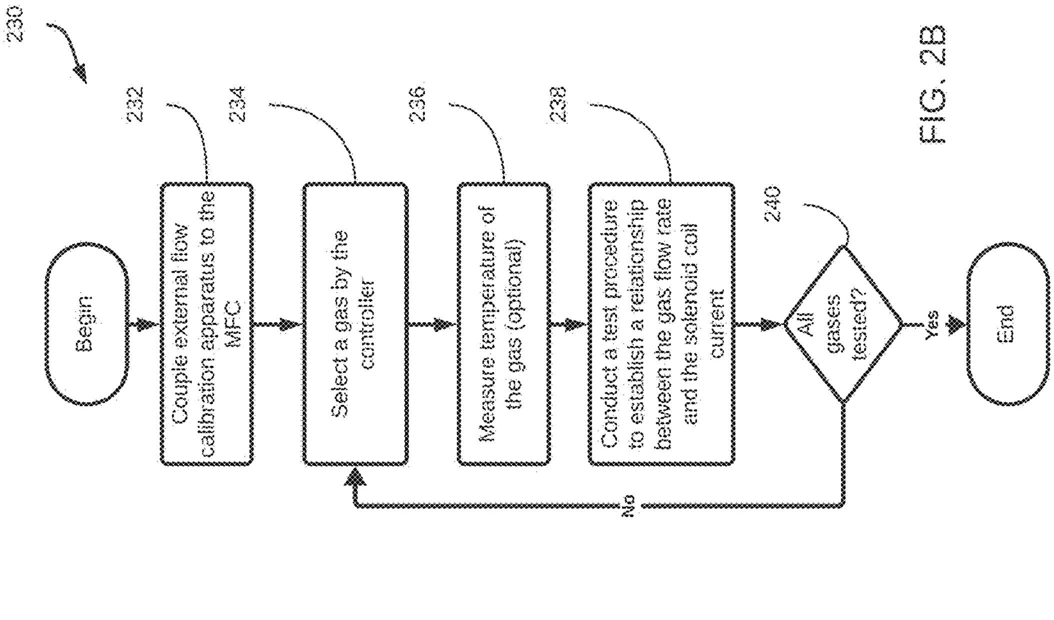
FIG. 2B: A flowchart of an exemplary calibration process for the embodiment.
Figure 2A:
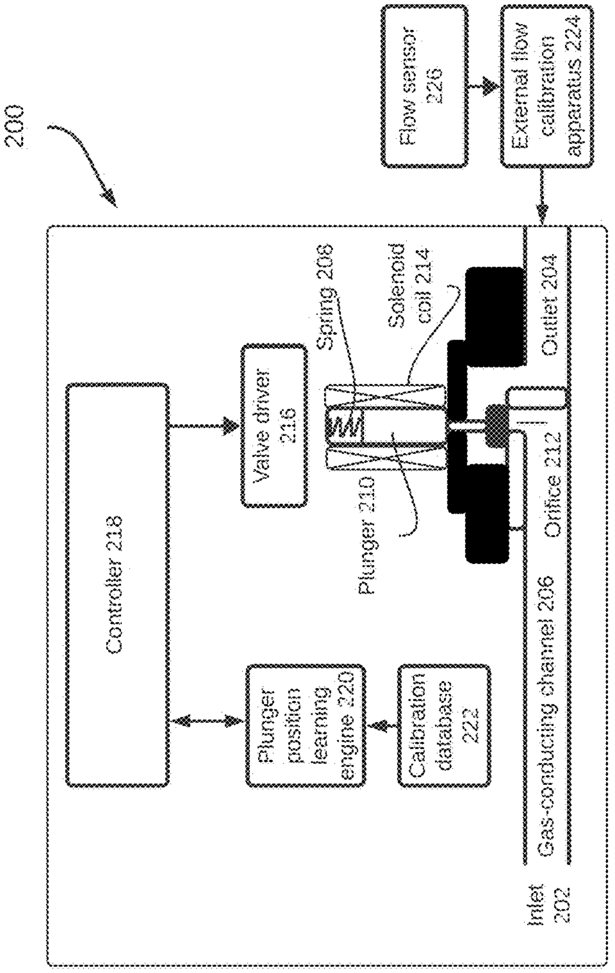
FIG. 2A: A schematic representation of an embodiment where an external calibration apparatus is employed, without the need for a proportional valve, an upstream flow sensor, or a PID control loop.

An embodiment of the current invention is depicted in FIG. 2A. The exemplary MFC 200 features a gas inlet 202 and a gas outlet 204, both connected to the gas-conducting channel 206. Gases passing through channel 206 can be in the form of singular or mixed gases. Additionally, the conduit may channel individual or mixed vapors or liquids, or even a composite of gas, vapor, and liquid. It is pivotal to emphasize that the MFC 200, in this example, eliminates the necessity for a proportional valve to allocate a segment of the gas for flow sensor assessment. The MFC 200 further eliminates the necessity for a PID control loop.

MFC 200 integrates a solenoid control valve, built with a spring 208, which secures the plunger 210 in place. The plunger's 210 positioning vis-a-vis the orifice 212 dictates the gas flow rate within the channel 206. Mechanical force exerted by spring 208 anchors the plunger 210. Concurrently, a current coursing through the solenoid coil 214 generates a magnetic pull, enticing the plunger 210 towards the orifice 212. The equilibrium between the mechanical force from spring 208 and the magnetic force from coil 214 informs the resting position of plunger 210.

Central to the operation of MFC 200 is the controller 218. This controller orchestrates the solenoid valve's functions through valve driver 216. This valve, in turn, channels the current to the solenoid coil 214, abiding by directives from controller 218. To enhance precision, controller 218 embeds a "plunger position learning engine" 220. This engine can manifest in various forms: as a software module within the controller 218, as firmware, or even as an amalgamation of both. Certain configurations also enrich the plunger position learning engine 220 with a calibration database 222.

For the accurate calibration of this MFC 200, there is a requisite to discern the correlation between coil current and gas flow rate. To this end, an external flow calibration apparatus 224 can be interfaced either directly or indirectly with outlet 204. This calibration process seeds the foundational data for calibration database 222. Augmenting the capabilities of the calibration apparatus 224 is the inclusion of a flow sensor 226.

The flowchart of an exemplary calibration process 230 is presented in FIG. 2B. The process initiates with the coupling of the calibration apparatus 224 to the MFC 200 in step 232. In step 234, a particular gas is chosen for assessment. In one implementation, in step 236, the temperature of the gas might optionally be measured. In other implementations, the gas's temperature may be adjusted, either by heating or cooling, to expand the measurement domain.

Proceeding to step 238, the controller 218 administers a testing procedure. This involves the creation of a lookup table, which establishes a relationship between the measured gas flow rate, as determined by the flow sensor 226, and the solenoid coil current. It is imperative that the assessed gas flow rate encompasses a broad spectrum to ensure comprehensive coverage of possible application domains. In specific scenarios, the solenoid coil currents might also be evaluated and calibrated. Multiple gases can be sequentially tested to enhance the calibration's scope.

The process then moves to step 240, where an assessment is made to determine if all the gases under consideration have been tested. If the evaluation is affirmative, the process advances to its concluding stage. Upon wrapping up the calibration process 230, the freshly generated calibration database 222 is then integrated into the controller 218 for storing in a storage unit. While gases are the focal point in this illustration, it is noteworthy that vapors, liquids, as well as mixtures of gases, vapors, and liquids, can also be subjected to this calibration method, thereby contributing to the formulation of the calibration database 222.

FIG. 3A illustratively displays data amassed by the controller 218, which constitutes a segment of the database 222. The data set 302 pertains to gas A at temperature T1, while another data set 304 corresponds to gas B at temperature T2. Both gases, A and B, potentially encompass data spanning a myriad of temperatures. A multitude of gases and liquids can be evaluated across varying temperatures. The entirety of this data is cataloged within an expansive lookup table 301, visually represented in FIG. 3B.

The procedure 300, outlining the utilization of lookup table 301 to ascertain the requisite solenoid coil current for a specific flow rate, is presented in FIG. 3C. This process 300 commences with step 303 wherein the controller 218 receives input detailing the desired flow rate for a particular gas or liquid. In the context of semiconductor manufacturing, this requisite flow rate is typically furnished by a process recipe.

Transitioning to step 305, the controller 218 calculates the necessary solenoid coil current, drawing from the data in lookup table 301. For instance, in the scenario concerning gas A, if the stipulated flow rate lies between values F2 and F3, linear extrapolation is employed to deduce the requisite solenoid coil current within the bounds of I2 and I3. In certain configurations, a model, mapping the solenoid coil current to the flow rate, might be established. Upon the controller 218 receiving a specific flow rate, this established function aids in computing the necessary solenoid coil current. Elaborating further, in some designs, the solenoid coil current undergoes direct measurement and calibration, ensuring the current generated by the controller 218 mirrors the observed value.

Advancing to step 306, the valve driver 216 is instructed by the controller 218 regarding the appropriate solenoid coil current. Subsequently, the valve driver 216 channels the specified current to the solenoid coil 214, prompting a repositioning of the plunger 210 in alignment with the current directed to the solenoid coil.

Lastly, in step 308, the designated gas is channeled through the gas conducting channel 206. This gas, with its calibrated flow rate, is then dispatched to a processing chamber via orifice 212. The flow is modulated by the plunger 210, which adjusts gas conductance, culminating in its egress through outlet 204.

Figure 4B:
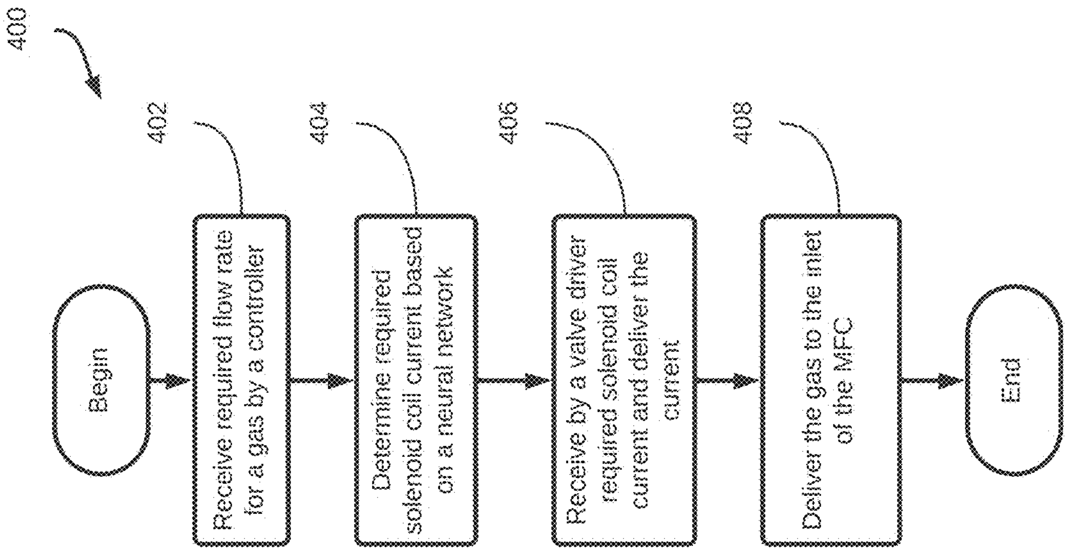
FIG. 4B: A flowchart, showcasing an embodiment where a neural network determines the solenoid coil current.
Figure 4A:
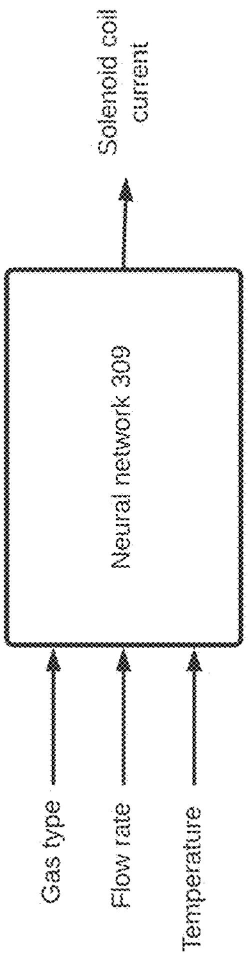
FIG. 4A: A diagram, illustrating employing a neural network to determine solenoid coil current.

FIG. 4A and FIG. 4B showcase another embodiment of the current invention. Here, the lookup table 301 is substituted with a neural network 309. This neural network can be trained utilizing the data from the calibration database 222. To ascertain the solenoid coil current, an inference operation is conducted, which considers various inputs. These inputs encompass, but are not restricted to, the gas type, its flow rate, and the temperature, as demonstrated in FIG. 4A.

FIG. 4B portrays the process to deduce the solenoid coil current using the neural network 309. The process, labeled 400, initiates at step 402, where the controller 218 receives the desired flow rate for a specific gas, vapor, or liquid. In the realm of semiconductor manufacturing, this flow rate is commonly derived from a process recipe.

Transitioning to step 404, the controller 218 inferences the necessary solenoid coil current, leveraging the neural network 309. This neural network has been trained using the data collated in the calibration database 222. When determining the requisite solenoid coil current, an inference operation is executed on the trained neural network. This operation factors in several variables such as the type of gas, its flow rate, and the prevalent temperature, as depicted in FIG. 4B. Expanding on this, certain designs might also entail direct measurement and calibration of the solenoid coil current. As a result, the current dispensed by the controller 218 faithfully represents the calibrated measurement.

Proceeding to step 406, the valve driver 216 is endowed with instructions from the controller 218, which detail the appropriate solenoid coil current. Following this, the valve driver 216 channels the prescribed current into the solenoid coil 214, culminating in the repositioning of the plunger 210 in tune with the delivered current.

In the concluding step 408, by actuating a valve for the inlet 202, the designated gas or liquid is ushered through the gas-conducting channel 206. This gas, vapor, or liquid, calibrated to the specified flow rate, is then relayed to a processing chamber. This conveyance is achieved via orifice 212, where the flow's modulation is overseen by the plunger 210, ultimately leading to its exit through outlet 204.

The calibration of MFCs can be performed in various locations. In some implementations, the manufacturer of the MFCs may carry out the calibration procedure and store the collected data in the controller's memory. In other implementations, system integrators, such as semiconductor equipment vendors, may perform the calibration. Additionally, MFCs can be calibrated in semiconductor Fabs by Fab operators. It is crucial to use the same calibration apparatus for MFCs for different chambers in a Fab to ensure matched process performance by delivering the exact same fluid flow rate for identical process recipes.

The invention claimed is:

1. A mass flow controller, comprising:
- a fluid conducting channel without a proportional pump;
- an inlet structured to receive a fluid into the fluid conducting channel;
- an outlet structured to discharge the fluid via from the fluid conducting channel;
- a solenoid control valve that includes a spring, a plunger disposed in a position in proximity to an orifice within the fluid conducting channel, and a solenoid coil, wherein a solenoid coil current determines the position of the plunger relative to the orifice to control a fluid flow rate through the fluid conducting channel; and
- a controller configured to regulate the operations of the mass flow controller by determining the solenoid coil current without using a proportional-integral-derivative (PID) control loop, wherein the solenoid coil current is determined based on a desired fluid flow rate derived from a process recipe and a calibration database stored in the controller, and wherein the calibration database is created through a calibration procedure involving an external flow calibration apparatus connected to the outlet.

2. The mass flow controller of claim 1, wherein the calibration database includes a lookup table.

3. The mass flow controller of claim 2, wherein the lookup table contains calibration data for various fluids assessed at different temperatures.

4. The mass flow controller of claim 1, wherein the calibration database is processed by a neural network.

5. The mass flow controller of claim 4, wherein the neural network is trained using data obtained with the assistance of the external flow calibration apparatus.

6. The mass flow controller of claim 4, wherein the neural network performs inference operations to determine the appropriate current for the solenoid coil after the controller receives a flow rate from a process recipe.

7. The mass flow controller of claim 1, wherein, in the absence of a current to the solenoid coil, the plunger blocks the orifice.

8. The mass flow controller of claim 1, wherein the plunger blocks the orifice when a specified current is applied to the solenoid coil.

9. The mass flow controller of claim 1, further comprising a flow sensor located downstream of the solenoid control valve.

10. The mass flow controller of claim 1, wherein the calibration procedure can be conducted by a mass flow controller manufacturer, a semiconductor equipment vendor, or a semiconductor Fab operator.

11. A method of controlling the flow rate of a fluid in a mass flow controller including a fluid conducting channel, an inlet structured to receive the fluid into the fluid conducting channel, an outlet structured to discharge the fluid from the fluid conducting channel, and a solenoid control valve that includes a spring, a plunger disposed in a position in proximity to an orifice within the fluid conducting channel, and a solenoid coil, wherein a solenoid coil current determines a position of the plunger relative to the orifice to control a fluid flow rate through the fluid conducting channel, comprising the steps of:
- creating a calibration database by connecting an external flow calibration apparatus to the outlet of the mass flow controller;
- including in the calibration database a relationship between a flow rate and a solenoid coil current for various gases, vapors, and liquids;

storing the calibration database in a storage unit of the mass flow controller;

using a controller to determine the appropriate current to be directed to the solenoid coil based on a desired flow rate of a chosen fluid outlined in a process recipe and referencing the calibration database;

delivering the determined current to the solenoid coil to adjust the plunger of the solenoid control valve to a specific position; and conducting the fluid from the inlet to the outlet of the mass flow controller without diverting any part of the fluid for flow rate measurement.

12. The method of claim 11, further comprising creating a lookup table using data from the calibration database.

13. The method of claim 12, further comprising determining the solenoid current based on data in the lookup table.

14. The method of claim 11, further comprising developing a neural network using the calibration database and training the neural network with data from the calibration database.

15. The method of claim 14, further comprising determining the solenoid current using inference operations performed by the trained neural network.

16. A fluid delivery system, comprising:

a mass flow controller including:

a fluid conducting channel, an inlet structured to receive a fluid into the fluid conducting channel; an outlet structured to discharge the fluid from the fluid conducting channel;

a solenoid control valve that includes a spring, a plunger in a position in proximity to an orifice within the fluid conducting channel, and a solenoid coil, wherein a solenoid coil current commanded from a controller determines a position of the plunger relative to the orifice to control a fluid flow rate through the fluid conducting channel, wherein the controller is configured to determine the solenoid coil current corresponding to the fluid's flow rate based on a calibration database; and a flow calibration apparatus designed to be attached to the outlet of the mass flow controller, wherein the calibration database is created using the flow calibration apparatus.

17. The fluid delivery system of claim 16, wherein the controller is configured to calculate the solenoid current by referencing a lookup table.

18. The fluid delivery system of claim 16, wherein the controller is configured to determine the solenoid current using a neural network.

19. The fluid delivery system of claim 16, wherein the external flow calibration apparatus includes a flow sensor for evaluating the fluid dispensed from the outlet of the mass flow controller.

20. The fluid delivery system of claim 16, wherein the external flow calibration apparatus includes a test procedure for generating various gases and liquids to calibrate the mass flow controller.

* * * * *